(12) United States Patent
Alton et al.

(10) Patent No.: US 6,311,079 B1
(45) Date of Patent: *Oct. 30, 2001

(54) WIRELESS TELEPHONY RING DETECTION METHOD FOR EXTENDED BATTERY LIFE

(75) Inventors: Ken Alton; Steven E. Hebeler, both of Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,644

(22) Filed: May 15, 2000

Related U.S. Application Data

(63) Continuation of application No. 09/059,115, filed on Apr. 13, 1998, now Pat. No. 6,144,840.

(51) Int. Cl.$^7$ .............................. H04B 1/38; H04B 1/16; H04Q 3/02
(52) U.S. Cl. .................. 455/567; 455/38.3; 455/462; 455/343; 455/574
(58) Field of Search ...................... 455/566, 575, 455/567, 462, 343, 574, 38.3, 465, 464; 379/106.09, 372, 377

(56) References Cited

U.S. PATENT DOCUMENTS

| | | | |
|---|---|---|---|
| 4,562,307 | 12/1985 | Bursztejn et al. | 179/2 E |
| 4,679,244 | 7/1987 | Kawasaki et al. | 455/54 |
| 4,731,814 | 3/1988 | Becker et al. | 379/62 |
| 4,736,461 | * 4/1988 | Kawasaki et al. | 455/343 |
| 5,054,052 | 10/1991 | Nonami | 379/57 |
| 5,237,603 | 8/1993 | Yamagata et al. | 379/61 |
| 5,297,203 | 3/1994 | Rose et al. | 379/62 |
| 5,301,225 | 4/1994 | Suzuki et al. | 379/59 |
| 5,406,623 | * 4/1995 | Rovik | 379/418 |
| 5,590,396 | 12/1996 | Henry | 455/33.1 |
| 5,627,882 | 5/1997 | Chien et al. | 379/61 |
| 5,715,308 | * 2/1998 | Shankarappa | 379/373 |

\* cited by examiner

*Primary Examiner*—Vivian Chang
*Assistant Examiner*—Charles N. Appiah
(74) *Attorney, Agent, or Firm*—Williams, Morgan & Amerson

(57) ABSTRACT

A cordless telephone apparatus and method of use thereof with a telephone system providing a ring cadence as a series of alternating ring and silence periods over a telephone line. The cordless telephone comprises a handset that is configured and arranged to operate in a low power mode during periods of inactivity on the telephone line and, in response to receiving a least one ring message, in a normal power mode in which the battery-powered handset acknowledges receipt of the ring message. The cordless telephone further comprises a base unit is configured and arranged to respond to a ring signal received over the telephone line by sending the ring message to the battery-powered handset through the end of each ring period, and for a portion of the subsequent silent period, until the handset reverts to the normal power mode and acknowledges receipt of the ring message. Accordingly, as soon as the handset acknowledges receipt of the ring message, the base unit can cease sending of the ring message if the ring period has ended. This method of operation for the cordless telephone provides extended battery life for a cordless telephone operation by permitting the handset to operate in a low-power, standby mode for greater periods of time through the use of a particular method of ring detection.

30 Claims, 4 Drawing Sheets

WIRELESS TELEPHONY RING DETECTION METHOD FOR EXTENDED BATTERY LIFE

This is a continuation of application Ser. No. 09/059,115 filed Apr. 13, 1998 now U.S. Pat. No. 6,144,840.

FIELD OF THE INVENTION

The present invention relates to a wireless telephone apparatus and method of operating of a wireless telephone system and, more particularly, to an apparatus and method for providing extended battery life for a wireless telephone apparatus.

BACKGROUND OF THE INVENTION

Power consumption is important in most electronic devices, and is especially important in battery-powered electronic devices. In order to reduce power consumption in these battery-powered devices, chips or circuits in these devices are often designed to maintain a low power standby mode of operation when not in use. Consequently, substantial operating power may be conserved. It is often difficult, however, to quickly bring chips or circuits out of standby mode to fully operational, active mode in response to the occurrence of certain events or conditions, such as interrupts or flags. To maintain quick operational responsiveness to such events or conditions, a wake-up timer is sometimes employed to bring the chip or circuit from the low-power, inactive state to a fully operational active state. Such a timer remains active while the rest of the circuit is in an inactive, standby mode. Accordingly, when the event or condition occurs, the wake-up timer must "wake", or bring out of a standby mode, the chip or circuit. For many applications, it is desirable for battery-powered electronic devices to be designed to operate in an inactive, standby mode as long as possible.

For one particular digital wireless telephone consisting of a battery-powered handset and a wall-powered base station, the handset and base station communicate with each other over a predetermined frequency band through the use of digital radio transmissions. When the base station receives an incoming call from the Central Office, or similar exchange such as a private PBX, it begins to continuously transmit digitally encoded messages to the handset. When the handset detects these ringing and link establishment messages coming from the base unit, it immediately responds with digital messages of its own to inform the base station that it is within range and is capable of receiving a call.

A typical battery-powered, wireless telephone handset operates in an inactive, low power standby mode where the handset is not listening for messages from the base unit. The handset also operates in an active mode where the handset scans for the presence of base station messages. When in its standby mode, the handset must periodically wake up from the low power mode to search for incoming ring messages from the base station. If the handset stays in this inactive mode too long, it will miss the initial active ringing period corresponding to the first valid ring signal received from the Central Office or similar central telephone system. One particular design requirement for cordless telephones is to provide an audible signal in response to the receipt of the first valid ring signal. This audible signal is needed as soon as possible to inform a user of the existence of the incoming call. If the handset is in its inactive mode for the entire 2 second time period of the initial ring signal, the handset would fail to provide an audible signal to the user for a period of delay of up to 6 seconds after the receipt of the first ring signal. This delay period of up to 6 seconds is unacceptably long. As such, cordless telephone handsets are typically configured and arranged to provide some type of audible signal in response to every ring signal asserted by an attached telephone system. Many handsets are configured to remain in the inactive mode for approximately one second before waking up to scan for incoming ring messages. If no ring messages are found, the handset re-enters the inactive state for a one second period of time when the process repeats. The one second time period is chosen to ensure that the handset scans for ring messages during a portion of every two second ring signal, and thus timely provide the audible signal.

The drawback to having the handset wake up frequently is that the handset uses a significant amount of power every time it wakes up to scan for ring messages which are usually not present. This significant amount of power consumption significantly limits the life of a charged battery in the handset. The amount of power taken from the battery is directly proportional to the amount of time the handset spends in the active mode. Therefore, the useful life of the battery could be extended if the amount of time the handset spends in the active mode is decreased.

SUMMARY OF THE INVENTION

The present invention is directed to a cordless telephone apparatus and method of use thereof with a telephone system providing a ring cadence as a series of alternating ring and silence periods over a telephone line. In one particular embodiment, a cordless telephone apparatus includes a battery-powered handset and a base unit. The battery-powered handset is configured and arranged to operate in a low power mode during periods of inactivity on the telephone line and, in response to receiving a least one ring message, in a normal power mode in which the battery-powered handset acknowledges receipt of the ring message. The base unit is configured and arranged to respond to a ring signal received over the telephone line by sending the ring message to the battery-powered handset through the end of each ring period, and for a portion of the subsequent silent period, until the handset reverts to the normal power mode and acknowledges receipt of the ring message. Accordingly, as soon as the handset acknowledges receipt of the ring message, the base unit can cease sending of the ring message if the ring period has ended.

According to another aspect of the present invention, a method of providing extended battery life for a cordless telephone operation by permitting the handset to operate in a low-power, standby mode for greater periods of time through the use of a particular method of ring detection. When a valid ring signal is detected by the cordless telephone base unit, a series of ring messages are transmitted to the handset until at least one response message is received from the handset. Once the first response message is received, additional ring messages are sent only during a valid ring period corresponding to the receipt of a valid ring signal by the base unit.

The above summary of the present invention is not intended to describe each illustrated embodiment or every implementation of the present invention. The figures in the detailed description which follow more particularly exemplify these embodiments.

BRIEF DESCRIPTION OF THE DRAWINGS

The invention may be more completely understood in consideration of the detailed description of various embodiments of the invention which follows in connection with the accompanying drawings, in which:

FIG. 4 is a detailed timing diagram of the ring signal sequence according to the example embodiment of the present invention shown in FIG. 3a.

Figure 1A:
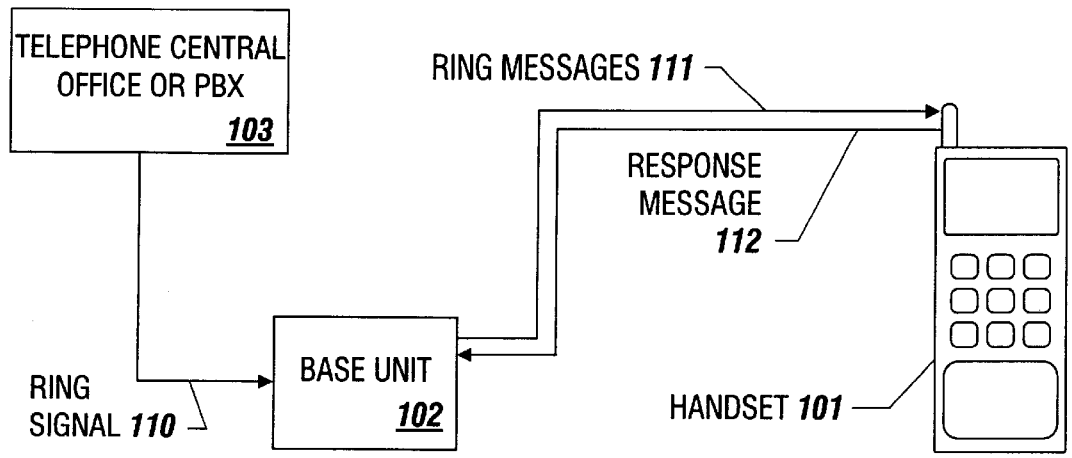
FIGS. 1a, 1b, and 1c are block diagrams of example embodiments of a wireless telephone system according to the present invention, including a base unit and a battery-powered handset.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of systems and arrangements which respond to a ring cadence as a series of alternating ring and silence periods over a telephone line, and in which power savings is obtained during periods of inactivity on the telephone line. The invention has been found to be particularly advantageous in application environments where a cordless telephone apparatus is implemented as a battery-powered handset operating in a low power mode during periods of inactivity on the telephone line, and with a base unit responding to a ring signal received over the telephone line by sending messages to the battery-powered handset to switch the handset from a the low power mode to a normal power mode for full operation. While the present invention is not so limited, in appreciation of various aspects of the invention, it is best gained through a discussion of application examples operating in such an environment. In the immediate discussion that follows, the ring cadence described corresponds to the typical ring cadence used in the United States of America. The present invention is, of course, applicable to other ring cadences and to other systems providing such ring cadence sequences.

Referring to FIG. 1a, the operation of a cordless telephone handset 101 and base unit apparatus 102 when a call is being placed to a particular location is initiated by the transmission of a valid ring signal 110 from a telephone central office or PBX 103 to the base unit 102. The base unit 102 responds to the receipt of this ring signal 110 by transmitting a series of messages 111 to the handset 101. These transmitted messages include a series of ring messages while the valid ring signal 110 is asserted to instruct the handset to provide an audible signal to inform users of this incoming call. In a typical telephone, the ring alert consists of a ringing of a bell.

The handset 101 informs the base unit 102 that it has successfully received the transmitted ring message 111 by transmitting a response message 112 back to the base unit in response to each received ring message. The exchange of messages between the base unit and the handset allows the initiation of the two way radio communications in response to the incoming call to be completed by the time the user of the telephone attempts to answer the call, and subsequently, attempts to begin his or her conversation using the handset. The exchange of the sequence and messages allows an orderly initialization of the system as the call is being answered.

Figure 1B:
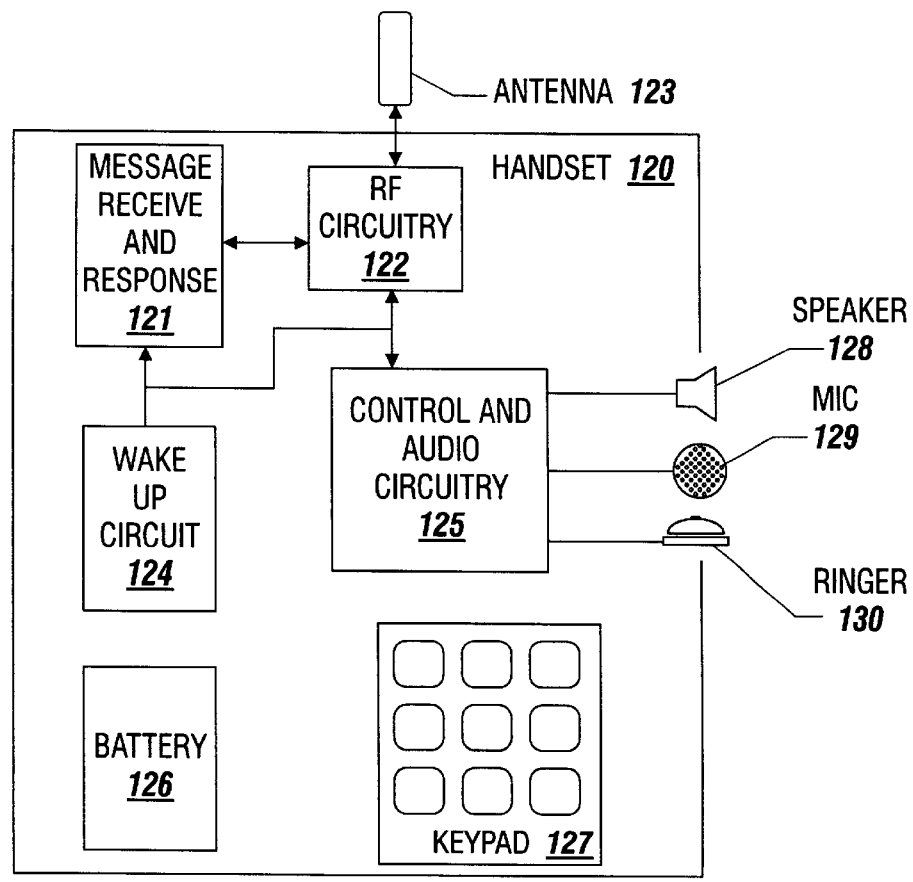

FIG. 1b is a block diagram for an example embodiment of a handset according to the present invention. The handset 121(o) consists of several components including a battery 126 which provides the electrical current for the handset. A 12-key numeric keypad 127 is used to provide the standard telephone keypad for dialing. Control and auditory circuitry 125 performs the basic telephone operating functions required to drive the speaker 128 to receive input the microphone 129 and operate the ringer 130. RF circuitry 122 provides the communications channel to the base unit using antenna 123. A control message receive and response circuit 121 detects ring messages and generates successful response messages. A wake up circuit 124 which provides the mechanism to switch the handset between a low power standby mode and a high power active mode.

Figure 1C:
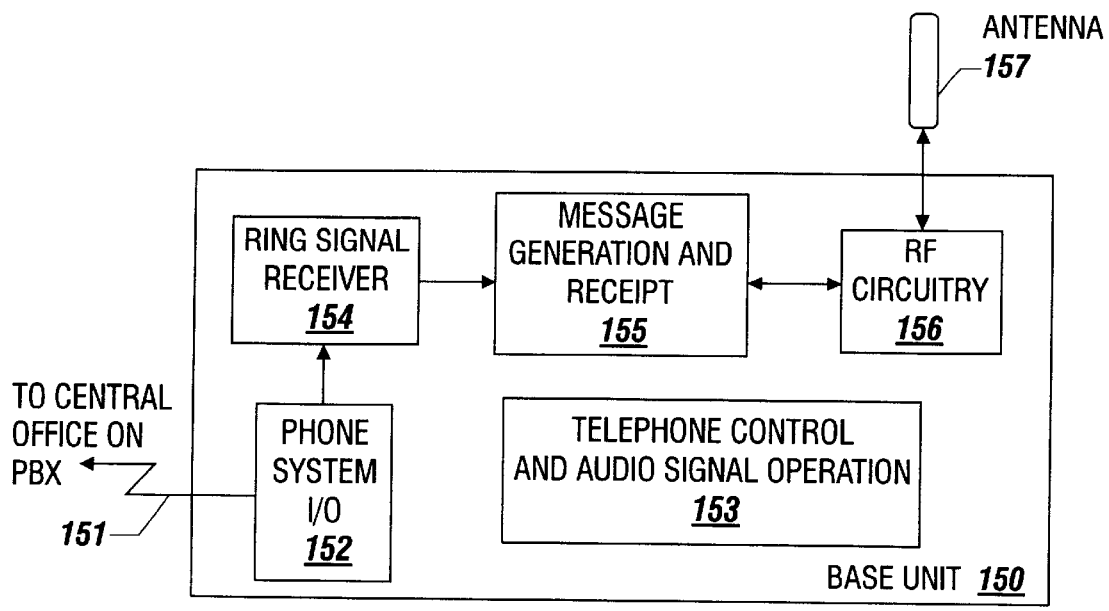

In FIG. 1c, a block diagram of the corresponding base unit of the cordless telephone apparatus is shown. The base unit consists of a connection to the central telephone office or private PBX 151, telephone system 10 circuit 152, a valid ring signal receiver 154, a handset message generation and receive circuit 155, RF circuitry 156, an antenna 157 and a control and phone/audio signal operation circuit 153. The handset in the base unit 150 receives signals from a central office or private PBX over input 151 and is received by the input circuitry 152. When the base unit detects the valid ringing signal in its receiver 154, a message to the handset is generated 155 and communicated to the handset using the RF circuitry 156 and the antenna 157. The telephone control and audio signal operation circuitry 153 of the base unit performs all the necessary and typical functions required to initiate communications with the handset using the present invention as well as control the communications with the central office or private PBX to initiate and terminate calls. The components used to construct handset 120 and base unit 150 as shown in FIGS. 1b and 1c are not described in any additional detail in the detailed description because the focus here of the present invention involves the functional communication between the handset and the base unit as a valid call is being received as discussed below. These telephone related functions can be implemented in any number of embodiments in combination with the present invention described herein to implement the present invention.

Figure 2:
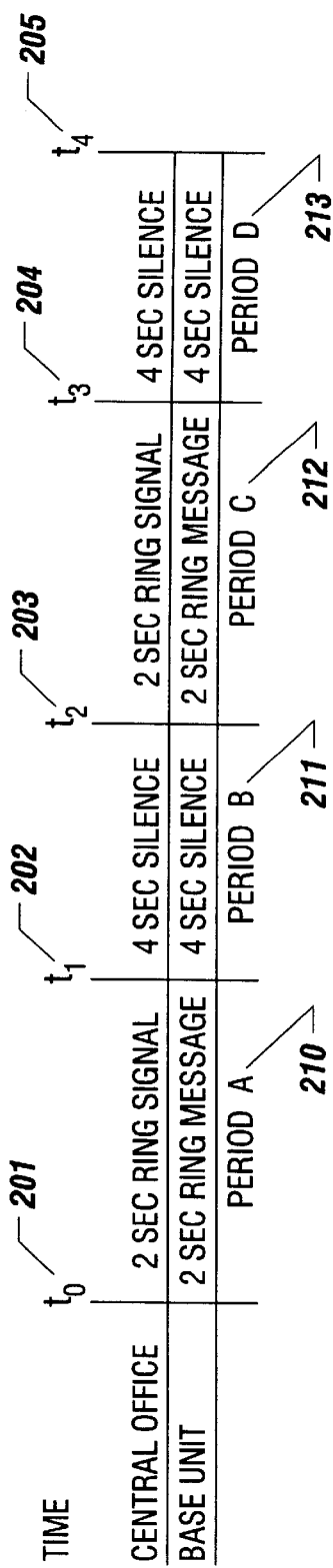
FIG. 2 is a timing diagram of a particular telephone ring signal sequence.

FIG. 2 is a timing diagram which shows a typical telephone ring cadence used in the U.S. During the initial time period after the call is received at the central telephone office or private PBX, a valid ring signal is asserted by the central office for a period of two seconds. This period is identified as Period A 210 within FIG. 2. At the end of Period A 210, the central office deactivates the ring signal to provide a four second period of silence during the time period identified as Period B 211. Next, the central office or PBX reasserts the ringing signal for a two second period of time during Period C 212; which is again followed by silence. The four second silence period in which the ring signal is deactivated, Period D 213. This signal pattern repeats with the two second period of an asserted ring signal followed by a four second period of silence either until a person or device answers the incoming call or until the party making the call hangs up.

The handset in one example embodiment according to the present invention is a battery-powered device which operates within two basic operating modes. First, the handset has a high power, active mode in which it is capable of listening for and receiving messages from the base unit as well as transmitting response messages upon receipt of these messages from the base unit. Because telephones are in use receiving, making, and/or conducting calls a significantly smaller period of time than they are in an inactive state awaiting the initiation or receipt of a call, handsets also operate in a low power, standdown mode in which the handset does not listen for base unit messages and does not transmit response messages if any are present. Significant power savings can be realized by deactivating most of the electronics within the handset during this standdown mode since the majority of electronics within the handset is only needed when the call is being made or received.

In order to ensure the handset responds to every incoming call, the handset must periodically switch from the standdown mode to the active mode to listen for the presence of a ring message transmitted by the base unit. If no ring messages are present when the handset listens, it switches back to the standdown mode to conserve the charge stored within its batteries. The useful battery life of a handsets battery is directly related to the frequency, and thus the amount of total time, that the handset operates in the active mode. The longer the handset can stay in the standdown mode between the time when it listens for ring messages, the longer the useful lifetime of the battery. The handset of the present invention can utilize any of a variety of circuits for periodically switching between the standdown mode and the active mode. Examples of mechanisms which perform this switching mechanism between two operating modes include a microprocessor-controlled output and a discrete clock-based digital circuit.

The handset however, cannot arbitrarily lengthen the amount of time between the listening periods if it is ensure that it does not miss all of the ring messages which corresponds to first period when a valid ring signal is asserted by the central telephone office. If for example, the time between the active, and listening periods is greater than two seconds, all of the ring messages transmitted by the base unit during Period A 210 of FIG. 2 could be missed. In this case, the handset would be in the standdown mode from just prior to the start of Period A 210 until sometime after the start of Period B 212. As such, the handset would not receive, and thus would not respond, to any messages transmitted by the base unit during Period A 210.

To overcome this operating problem, and thus ensure that an audible signal is provided for the initial set of ring messages, the time between the active, listening periods for the handset is typically set to be approximately one second. In this case, even if the handset last listened for ring messages just prior to the beginning of Period A, the handset would "wake up" again one second later, which is in the middle of Period A, and thus have one second of time to respond to the ring messages, as well as to provide a useful audible signal to handset user, before the ring messages terminate at the beginning of Period B.

The handset would then remain in the active state during Period B 211 having received and responded to ring messages and thus be in the active state at the beginning of Period C 212 to again receive the ring messages to provide the audible signal and be awaiting response from the user. This process would continue until either the ring signals stop when a caller hangs up or until a user receives the call using the handset.

Figure 3A:
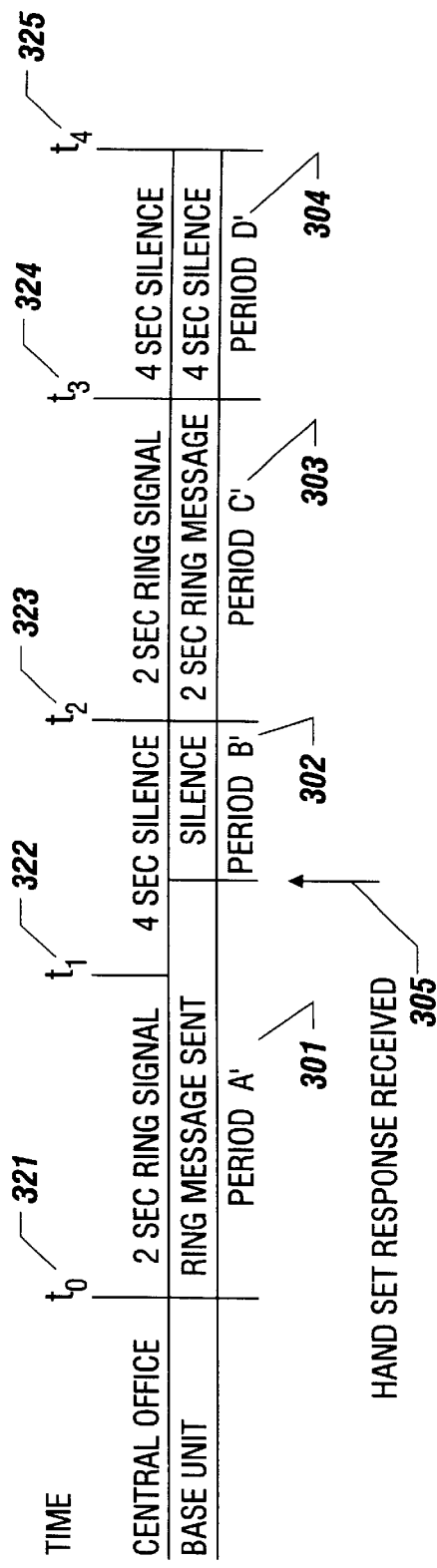
FIG. 3a is a timing diagram of the ring signal sequence according to one example embodiment of the present invention where the handset response is received after the termination of the initial ring signal.
Figure 3B:
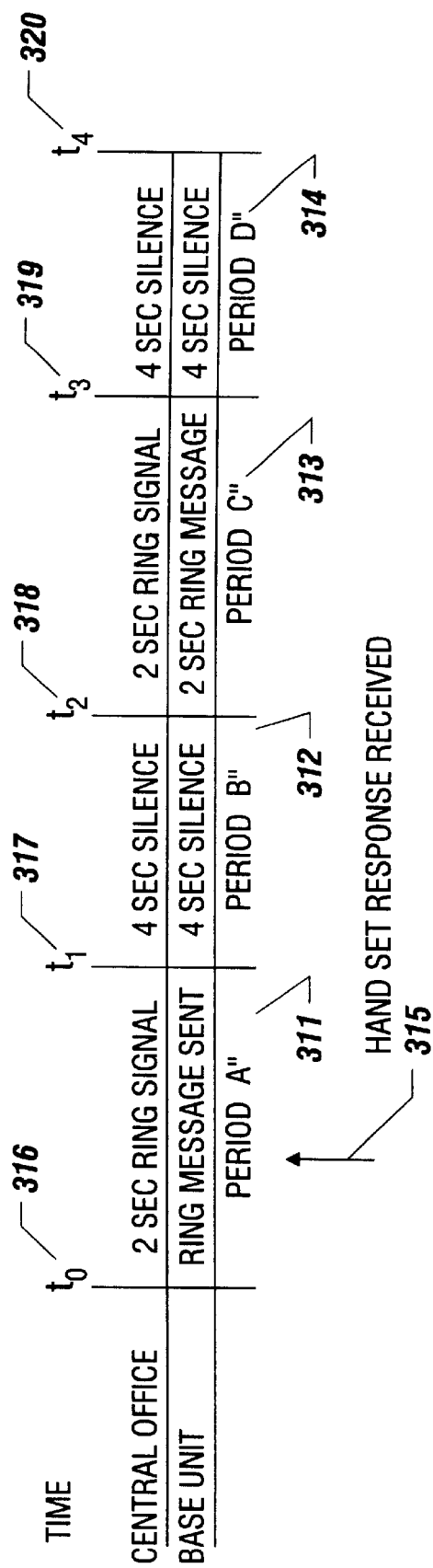
FIG. 3b is a timing diagram of the ring signal sequence according to one example embodiment of the present invention where the handset response is received before the termination of the initial ring signal.

The sequence of messages to be used in the present invention is demonstrated in FIGS. 3A and 3B. The top line of the sequence shows the status of the ring signal from the central office. This signal proceeds with the two second valid ringing signal followed by a four second silent period in an alternating fashion as is discussed previously with regards to FIG. 2. The call starts at time $t_0$ 321 when the central office asserts a valid ring signal which causes the base unit to start transmitting ring messages. Because the present invention attempts to extend the battery life of the handset by increasing the time between the periods in which the handset wakes up to listen for ring messages, the ring messages sent by the base unit are not received by the handset until after the end of the first two second ring signal period. Thus, the modified Period A 301 is extended as the base unit continues to send ring messages beyond the time $t_1$ 322 where the ring signal terminates. These ring messages continue until the handset responds after waking up and receiving one of the ring messages. In one particular embodiment of the present invention, the base unit transmits a ring message once every 15–18 ms. Upon receipt of the response from the handset 305, the base unit stops transmitting ring messages until the next period of time where the central office initiates a valid ring signal at $t_2$ 303. Since the handset then remains in an active state listening for messages after receipt of the first received ring message, the handset can receive the ring messages and begin transmitting the audible signal immediately upon the beginning of Period C 303, then continue on through the end of it at time $t_3$ 324 where silence again occurs during Period D 304.

The handset responds to the receipt of each ring message by providing an audible signal to inform the user of the existence of an incoming call. In one particular embodiment of the present invention, this audible signal is 400 ms long. This audible signal enables the user to recognize the existence of an incoming call and begin the process of answering the call. Without this initial audible signal, the user would not be informed of the incoming call until after the end of the 4 second silent period coesponding to Period B 302. In the case where the first two second ring signal is missed because the handset was in the standby mode, the failure to provide this initial audible signal could result in the first audible signal being provided nearly 6 seconds after the receipt of the incoming call. The present invention eliminates this deficiency while providing extended battery life.

The above sequence allows the time between the periods in which a handset listens to be extended while still allowing the handset to receive an indication that a call is being received and to provide the corresponding audible signal to the user. As this time between periods when the handset listens becomes greater, the amount of charge from the battery consumed during a given period of time is lessened and the total lifetime of the battery is extended.

In FIG. 3B, the message sequence is displayed for a situation in which the handset responds with a response message during the initial valid ringing signal Period A" 301. In this case, the base unit sends ring messages from the receipt of the valid ring message from the central office and the handset responds 315 upon receipt of the first message after it wakes up. In this case because the ring signal is still valid, the base unit will continue to transmit ring messages to allow the handset to provide the auditorial word to the user. This will continue until time $t_1$ 317 when Period B" 312, the four second period of silence begins. In this case because the base unit has received a valid response, the ring message sequence is stopped when the valid ring signal is deactivated. The handset provides an audible signal in response to each ring message received. In an embodiment where the ring messages are transmitted every 15–18 ms, the handset will receive a new ring message while the prior 400 ms audible signal is still being provided. In this situation, a timer controlling the length of the audible signal is reset in response to the receipt of each subsequent ring message. As such, a new 400 ms period begins upon the receipt of the subsequent ring message without the termination of the audible signal. FIG. 3b demonstrates that the audible signal is provided by the handset from the receipt of the first ring message after the handset wakes up until the end of the 400 ms period corresponding to the last ring message received. As is the case shown in FIG. 3a, the audible signal is always at least 400 ms in length. The process then continues for successive valid ringing signals as is done previously. This process will continue either the call is answered or until the calling party hangs up.

Figure 4:
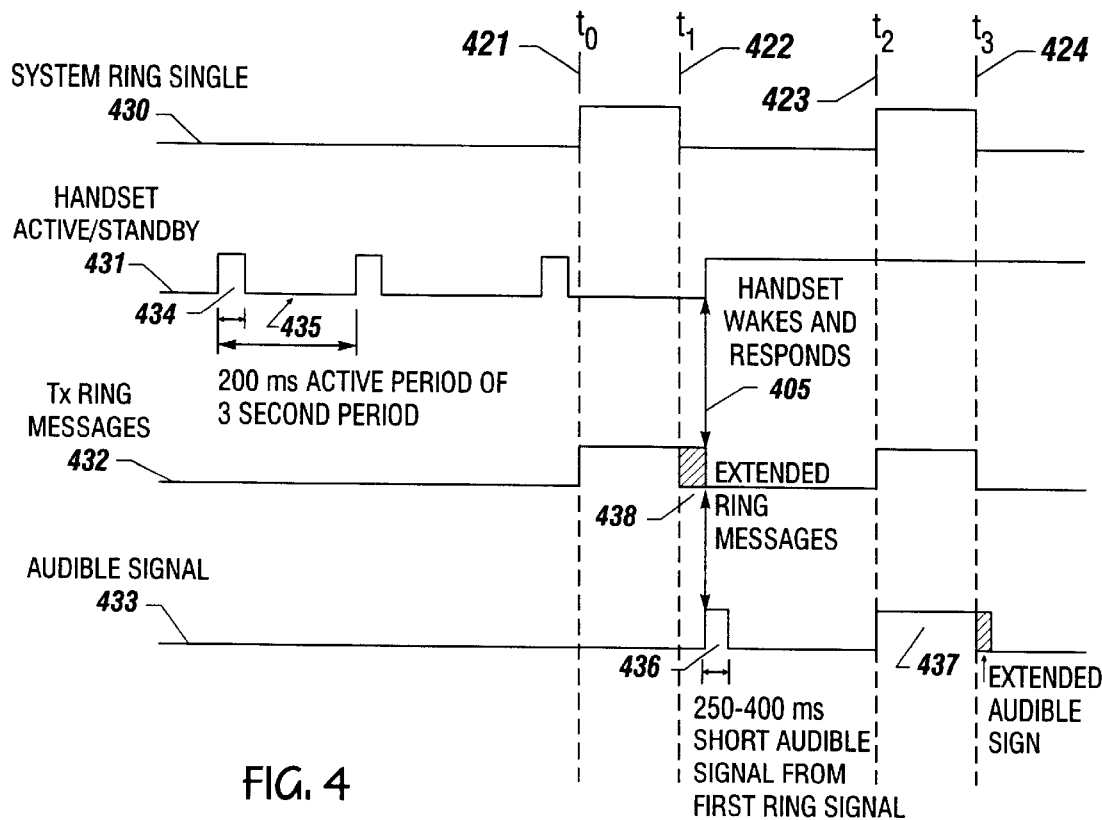

FIG. 4 is a detailed timing diagram of the sequence of messages used according to the example embodiment shown in FIG. 3a. The incoming call is initiated when the telephone system asserts the system ring signal 430 at time $t_0$ 421. This signal causes the base unit to begin transmitting the sequence of ring messages 432 to the handset. As has been discussed previously, the sequence of ring messages 432 continues with the transmission of extended ring messages 438 beyond time $t_1$ 422 until the handset responds with a message of its own at a time depicted as 405.

In this example embodiment of the present invention, the handset is operating in its standby mode at time $t_0$ and remains in the inactive mode until after the system ring signal 430 is deactivated at time $t_1$ 422. The operating mode of the handset is shown by the handset active/standby signal 431. When no call is present, the handset alternates between the active mode and the standby mode every 3 seconds 435. The handset operates in the active mode for 200 ms 434 in this example embodiment so that is can reliably detect the presence of base unit messages when these messages are present. In this example embodiment of the present invention, the duty cycle of the operating mode of the handset is 200 ms/3 s or approximately 6%. This duty cycle for the present invention compares to a duty cycle for a typical handset of 200 ms/1 s or 20%. The reduction in the duty cycle of the handset operating mode directly relates to the lengthening of the operating life of the handset battery.

The handset remains in the active mode of operation 431 after receiving the initial ring message 405. In addition to transmitting a response to the base unit, the handset provides an audible signal 433 for a short period of time 436. This short audible signal 436 is approximately 250–400 ms in length for this example embodiment of the present invention. This short audible signal can be any length desired; however, an audible signal much less than 250 ms risks not being recognized by a handset user. Additionally, an audible signal much greater than 400 ms risks merging with the audible signal corresponding to the second system ring signal at $t_2$ 423. A merger of this initial short audible signal with the second ring signal will cause the handset to ring constantly rather than provide the on and off ring cadence familiar to phone users. Once the handset is active and responding to base unit messages, the handset will provide a series of audible signals 437 which correspond to subsequent assertions of the system ring signal 430. As was discussed above, the audible ring signal 433 will remain active for a short period of time beyond the end of the system ring signal 430 at time $t_3$ because the example embodiment of the present invention provides the audible signal 433 for the 400 ms period from the receipt of the last ring messages received from the base unit. The base unit stops transmitting the ring messages at time $t_f$ 424 so that the audible signal 433 will end approximately 400 ms later.

The various embodiments described above are provided by way of illustration only and should not be construed to limit the invention. Those skilled in the art will readily recognize various modifications and changes which may be made to the present invention without strictly following the exemplary embodiments and applications illustrated and described herein, and without departing from the true spirit and scope of the present invention which is set forth in the following claims.

What is claimed is:

1. A cordless telephone apparatus for use with a telephone system providing a ring cadence as a series of alternating ring periods and silence periods, the cordless telephone apparatus comprising:

a handset configured and arranged to operate in a low-power mode during periods of inactivity and, in response to receiving at least one ring message, in a normal-power mode in which the handset acknowledges receipt of said at least one ring message; and a base unit having a handset/telephone-line interface circuit configured and arranged to respond to said series of alternating ring periods and silence periods by sending a series of the ring messages to the handset during each of said ring periods and extending into only a portion of each silence period following each of said ring periods.

2. A cordless telephone apparatus, according to claim 1, wherein the handset/telephone line interface circuit is further configured and arranged to send the ring message to the handset as a series of data messages.

3. A cordless telephone apparatus, according to claim 1, wherein the handset/telephone line interface circuit includes a processor circuit having a program, that when executed, causes the base unit to send the series of ring messages as set forth in claim 1.

4. A cordless telephone apparatus, according to claim 1, wherein the handset is battery powered.

5. A method of operating a communicatively-coupled battery-powered handset and base unit with a telephone system providing a ring cadence as a series of alternating ring periods and silence periods over a telephone line, the method comprising:

operating the battery-powered handset in a low-power mode during periods of inactivity and, in response to receiving at least one ring message, in a normal-power mode in which the battery-powered handset acknowledges receipt of said at least one ring message; and using the base unit to respond to said series of alternating ring periods and silence periods by sending a series of the ring messages to the battery-powered handset during each of said ring periods and extending into only a portion of each silence period following each of said ring periods.

6. A cordless telephone apparatus, according to claim 5, wherein a duty cycle of the handset is less than 10 percent.

7. A cordless telephone apparatus, according to claim 6, wherein the duty cycle of the handset is about 6 percent.

8. A cordless telephone apparatus for use with a telephone system providing a ring cadence as a series of alternating ring periods and silence periods over a telephone line, the cordless telephone apparatus comprising:

a battery-powered handset including:
      means for operating in a low-power mode during periods of inactivity on the telephone line; and in response to receiving at least one ring message, means for operating in a normal-power mode in which the battery-powered handset acknowledges receipt of said at least one ring message; and a base unit including:
means for detecting the series of alternating ring periods and silence periods; and
means for responding to the series of alternating ring periods and silence periods by sending the ring message to the battery-powered handset during each of the ring periods and extending into only a portion of each of the silence periods following each of the ring periods.

9. A method extending the useful lifetime of a handheld, battery-operated telephone handset and a base unit, in which the handset alternates its operation between one of two modes, wherein the modes include a low-power, standdown mode and a high-power active mode, the method comprising the steps of:

(a) the telephone base unit begins transmitting a series of ring messages to the handset upon assertion of a valid ring signal from a telephone central office, wherein the valid ring signal includes a series of alternating ring periods and silence periods, wherein at least one of the series of ring messages is transmitted during each of the ring periods and into only a portion of the silence period immediately following each of the ring periods;

(b) the handset switches from the standdown mode to the active mode after having been in the standdown mode for a first period of time;

(c) the handset listens for ring messages while operating in the active mode;

(d) the handset switches from the active mode to the standdown mode if the handset has not received any of the ring messages from the base unit within a second period of time;

(e) the handset transmits a response message to the base unit upon receipt of each ring message received from the base unit; and (f) the base unit stops transmitting the series of ring messages to the handset after the occurrence of the following:
  (1) receipt of at least one response message after beginning the transmission of the series of ring messages; and
  (2) deactivation of the ring signal by the central telephone office.

10. A cordless telephone apparatus, comprising:
a base unit, comprising:
means for receiving ring signal from a central telephone office a ring signal having a first duration followed by a silent period having a second duration;
means for receiving messages transmitted from a handset; and
means for transmitting a series of ring messages to the handset while the ring signal is present and into only a portion of each silent period, unless a response message has not been received from the handset in response to one or more ring messages, wherein the ring messages continue to be transmitted to the handset until either one or more response messages are received by the base unit, or no response message is received by the base unit within a first period of time from the end of the ring signal; and the handset, comprising:
means for switching the operation of the handset from a low-power, shutdown mode to a high-power, active mode after being in the shutdown mode for a first period of time extending substantially equal to or longer than the first duration;
means for receiving the ring messages transmitted by the base unit while operating in the active mode;
means for transmitting the response message back to the base unit upon receipt of each ring message while operating in the active mode; and
means for switching the operation of the handset from the active mode to the shutdown mode if no ring messages have been received from the base unit after listening for the ring messages in the active mode for a second period of time.

11. A cordless telephone apparatus, according to claim 10, wherein the handset is battery powered.

12. A cordless telephone apparatus for use with a telephone system providing a ring cadence as a series of alternating ring periods and silence periods over a telephone line in response to a telephone call, the cordless telephone apparatus comprising:

a handset including:
means for operating in a low-power mode during periods of inactivity on the telephone line;
in response to receiving at least one ring message, means for operating in a normal-power mode in which the handset acknowledges receipt of said at least one ring message; and
means for providing an indication of said at least one ring message to provide a notification of said telephone call; and a base unit including:
means for detecting the series of alternating ring periods and silence periods; and
means for responding to the ring periods by sending one or more ring messages to the handset during each of the ring periods and extending into only a portion of each of the silence periods following each of the ring periods.

13. A cordless telephone apparatus, according to claim 12, wherein said means for providing an indication of said at least one ring message is configured to provide said indication for at least a portion of a first one of the ring periods of said series of alternating ring periods and silence periods.

14. A cordless telephone apparatus, according to claim 12, wherein the base unit is further configured and arranged to send the ring message to the handset as a series of data messages.

15. A cordless telephone apparatus, according to claim 12, wherein the handset is battery powered.

16. A cordless telephone apparatus for use with a telephone system providing a ring cadence as a series of alternating ring periods and silence periods, the cordless telephone apparatus including a base unit comprising a handset/telephone-line interface circuit configured and arranged to respond to said series of alternating ring periods and silence periods by transmitting a series of the ring messages to a handset during each of said ring periods and extending into only a portion of each silence period following each of said ring periods.

17. A cordless telephone apparatus, according to claim 16, wherein the handset/telephone line interface circuit is further configured and arranged to send the ring message to the handset as a series of data messages.

18. A cordless telephone apparatus, according to claim 16, wherein the handset/telephone line interface circuit includes a processor circuit having a program, that when executed, causes the base unit to send the series of ring messages as set forth in claim 16.

19. A cordless telephone apparatus, according to claim 10, wherein the handset is battery powered.

20. A cordless telephone base unit configured along with a handset configured and arranged to operate in a low-power mode during periods of inactivity and in a normal-power mode in which the handset detects one or more ring messages to interoperate with a telephone system providing a ring cadence as a series of alternating ring periods and silence periods over a telephone line, the cordless telephone base unit comprising:

means for detecting the ring cadence as the series of alternating ring periods and silence periods; and means for responding to the ring periods by sending the one or more ring messages to the handset during each of the ring periods and extending into only a portion of each of the silence periods following each of the ring periods.

21. A cordless telephone apparatus for use with a telephone system providing a ring cadence as a series of alternating ring periods and silence periods, the cordless telephone apparatus including a handset configured and arranged to operate in a low-power mode during periods of inactivity and, in response to receiving at least one ring message from a base unit configured to respond to said series of alternating ring periods and silence periods by transmitting a series of the ring messages during each of said ring periods and extending into only a portion of each silence period following each of said ring periods, in a normal-power mode in which the handset acknowledges receipt of said at least one ring message.

22. A cordless telephone apparatus, according to claim 21, wherein a duty cycle of the handset is less than 10 percent.

23. A cordless telephone apparatus, according to claim 22, wherein the duty cycle of the handset is about 6 percent.

24. A cordless telephone handset configured along with a base unit that detects a ring cadence as a series of alternating ring periods and silence periods and responds to the ring cadence by sending one or more ring messages to the cordless telephone handset during each of the ring periods and extending into only a portion of each of the silence periods following each of the ring periods to interoperate with a telephone system providing the ring cadence as the series of alternating ring periods and silence periods over a telephone line, in respons to a telephone call the cordless telephone handset comprising:

means for operating in a low-power mode during periods of inactivity on the telephone line;

in response to receiving at least one of the ring messages from the base unit, means for operating in a normal-power mode in which the handset acknowledges receipt of said at least one of the ring messages from the base unit; and means for providing an indication of said at least one of the ring messages from the base unit to provide a notification of said telephone call including for at least a portion of a first one of the ring periods of said series of alternating ring periods and silence periods.

25. A cordless telephone handset, according to claim 24, wherein the cordless telephone handset is battery powered.

26. A cordless telephone handset, according to claim 24, wherein a duty cycle of the cordless telephone handset is less than 10 percent.

27. A cordless telephone handset, according to claim 26, wherein the duty cycle of the cordless telephone handset is about 6 percent.

28. A cordless telephone apparatus including a base unit, the base unit comprising:

means for receiving from a central telephone office a ring signal having a first duration followed by a silent period having a second duration;

means for receiving messages transmitted from a handset; and means for transmitting a series of ring messages to the handset while the ring signal is present and into only a portion of each silent period, unless a response message has not been received from the handset in response to one or more ring messages, wherein the ring messages continue to be transmitted to the handset until either one or more response messages are received by the base unit, or no response message is received by the base unit within a first period of time from the end of the ring signal.

29. A cordless telephone apparatus including a handset, the handset comprising:

means for switching the operation of the handset from a low-power, shutdown mode to a high-power, active mode after being in the shutdown mode for a first period of time;

means for operating in the high-power, active mode while receiving ring messages transmitted by a base unit in response to a central telephone office transmitting a ring signal having a first duration followed by a silent period having a second duration substantially equal to or less than the first period of time;

means for transmitting a response message back to the base unit upon receipt of each ring message while operating in the high-power, active mode; and means for switching the operation of the handset from the high-power, active mode to the low-power, shutdown mode if no ring messages have been recieved from the base unit after listening for the ring messages in the active mode for a second period of time less than the first period of time.

30. A cordless telephone apparatus, according to claim 29, wherein the handset is battery powered.

\* \* \* \* \*